(12) United States Patent
Deman et al.

(10) Patent No.: US 11,754,137 B2
(45) Date of Patent: Sep. 12, 2023

(54) COMPRESSION SPRING ASSEMBLY AND METHODS OF USING THE SAME

(71) Applicant: Silgan Dispensing Systems Corporation, Grandview, MO (US)

(72) Inventors: Eelco H. Deman, Waalwijk (NL); Paulus Zuijderduijn, Waalwijk (NL)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 17/372,838

(22) Filed: Jul. 12, 2021

(65) Prior Publication Data

US 2021/0341030 A1 Nov. 4, 2021

Related U.S. Application Data

(63) Continuation of application No. 16/589,991, filed on Oct. 1, 2019, now Pat. No. 11,060,580, which is a
(Continued)

(51) Int. Cl.
*F16F 1/44* (2006.01)
*F16F 1/377* (2006.01)
(Continued)

(52) U.S. Cl.
CPC .......... *F16F 1/377* (2013.01); *A47K 5/1205* (2013.01); *F16F 1/3605* (2013.01); *F16F 1/445* (2013.01); *B05B 11/00* (2013.01); *F16F 1/028* (2013.01)

(58) Field of Classification Search
CPC .......... F16F 1/377; F16F 1/3605; F16F 1/445; F16F 1/028; A47K 5/1205; B05B 11/00
(Continued)

(56) References Cited

U.S. PATENT DOCUMENTS 1,169,863 A * 2/1916 Peycke ..................... F16F 7/04
213/29
1,816,325 A 7/1931 Held
(Continued)

FOREIGN PATENT DOCUMENTS

CH 631249 A5 7/1982
CN 105605134 A 5/2016
(Continued)

*Primary Examiner* — Christopher P Schwartz
(74) *Attorney, Agent, or Firm* — Hinckley, Allen & Snyder, LLP; Stephen J. Holmes (57) ABSTRACT

An all plastic compression spring assembly includes a slotted tubular spring element formed from a tensile polymer material and upper and lower loading cones received at opposing upper and lower ends of the slotted tubular spring element. The upper loading cone may be axially compressible towards the lower loading cone within the slotted tubular spring element whereby the slotted tubular spring element radially expands in tension to create an opposing radial contraction force, and in turn, an axial extension spring force. When released, the spring element elastically returns to its normal at rest shape, returning the cones to their normal at rest positions. In some dispenser configurations, the lower loading cone may be stationary or fixed within the dispensing head and the upper loading cone may be downwardly compressible toward the lower loading cone by movement of a nozzle head.

18 Claims, 13 Drawing Sheets

Related U.S. Application Data continuation of application No. 15/861,056, filed on Jan. 3, 2018, now Pat. No. 10,473,176.

(51) Int. Cl.
  *F16F 1/36* (2006.01)
  *A47K 5/12* (2006.01)
  *F16F 1/02* (2006.01)
  *B05B 11/00* (2023.01)

(58) Field of Classification Search
  USPC ............ 267/33–35, 74, 139, 140, 152, 153, 267/196–207; 222/137; 213/29
  See application file for complete search history.

(56) References Cited

U.S. PATENT DOCUMENTS

| | | | |
|---|---|---|---|
| 2,216,231 A | 10/1940 | Dentler | |
| 2,233,110 A | 2/1941 | Piron | |
| 2,254,781 A | 9/1941 | Rabbitt | |
| 2,289,790 A | 7/1942 | Light | |
| 2,426,684 A * | 9/1947 | Haseltine | B61F 5/12 |
| | | | 267/209 |
| 2,570,370 A * | 10/1951 | O'Connor | F16F 7/00 |
| | | | 213/40 D |
| 2,570,371 A | 10/1951 | O'Connor | |
| 2,591,922 A | 4/1952 | Dath | |
| 2,724,588 A | 11/1955 | Sheets | |
| 3,134,585 A | 5/1964 | Trask | |
| 3,270,998 A | 9/1966 | Keetch | |
| 3,285,594 A | 11/1966 | LaBelle | |
| 3,331,600 A | 7/1967 | Goetz et al. | |
| 3,332,523 A | 7/1967 | Chambers | |
| 3,452,905 A | 7/1969 | Micallef | |
| 3,580,619 A * | 5/1971 | Maltais | F16D 1/0835 |
| | | | 403/372 |
| 3,624,764 A | 11/1971 | Goben | |
| 3,709,478 A | 1/1973 | Kisling, III | |
| 3,724,833 A | 4/1973 | Sergay | |
| 3,796,288 A | 3/1974 | Hollnagel | |
| 3,866,724 A | 2/1975 | Hollnagel | |
| 3,871,634 A | 3/1975 | Russold et al. | |
| 4,010,940 A | 3/1977 | Freyler | |
| 4,073,858 A | 2/1978 | Chung | |
| 4,260,143 A | 4/1981 | Kilger | |
| 4,471,893 A * | 9/1984 | Knickerbocker | B65D 83/48 |
| | | | 222/402.24 |
| 4,566,678 A | 1/1986 | Anderson | |
| 5,011,046 A | 4/1991 | Graf | |
| 5,030,490 A | 7/1991 | Bronowicki | |
| 5,174,421 A | 12/1992 | Rink | |
| 5,419,416 A | 5/1995 | Miyashita | |
| 5,437,439 A | 8/1995 | Brokamp et al. | |
| 5,447,257 A | 9/1995 | Dark | |
| 5,487,534 A * | 1/1996 | Sakamoto | F16F 1/403 |
| | | | 267/141.1 |
| 5,518,377 A | 5/1996 | Bougamont | |
| 5,651,536 A | 7/1997 | Daul | |
| 6,045,119 A | 4/2000 | Erb | |
| 6,053,371 A | 4/2000 | Durliat | |
| 6,223,954 B1 * | 5/2001 | Carow | B05B 11/3052 |
| | | | 222/340 |
| 6,401,752 B1 | 6/2002 | Blackbourn | |
| 6,470,910 B2 | 10/2002 | Blackbourn | |
| 6,520,385 B2 | 2/2003 | Bonningue | |
| 6,986,444 B2 | 1/2006 | Fuchs | |
| 7,025,233 B2 | 4/2006 | Masuda | |
| 7,299,949 B2 | 11/2007 | Greiner-Perth | |
| 7,338,034 B2 * | 3/2008 | Aspengren | B61F 5/142 |
| | | | 267/140 |
| 7,513,395 B2 | 4/2009 | Labinski | |
| 8,113,239 B2 | 2/2012 | Richards | |
| 8,402,999 B2 | 3/2013 | Nini | |
| 8,464,917 B2 | 6/2013 | Nini | |
| 8,465,009 B2 | 6/2013 | Sprainis et al. | |
| 8,474,664 B2 | 7/2013 | Ophardt | |
| 9,204,766 B2 | 12/2015 | Wang | |
| 9,539,597 B2 | 1/2017 | Ding | |
| 9,580,292 B2 | 2/2017 | Smith et al. | |
| 10,138,971 B1 | 11/2018 | Deman | |
| 10,473,176 B2 * | 11/2019 | Deman | F16F 1/445 |
| 10,495,173 B2 | 12/2019 | Deman et al. | |
| 10,526,191 B1 | 1/2020 | Driskell et al. | |
| 11,035,429 B2 * | 6/2021 | Deman | F16F 1/028 |
| 11,060,580 B2 * | 7/2021 | Deman | B05B 11/3076 |
| 2004/0084820 A1 | 5/2004 | Kato et al. | |
| 2005/0281631 A1 | 12/2005 | Bernstein | |
| 2006/0208008 A1 | 9/2006 | Sweeton | |
| 2007/0045349 A1 | 3/2007 | Foster | |
| 2007/0119864 A1 | 5/2007 | Tsai | |
| 2010/0059470 A1 * | 3/2010 | Carlstedt | F16F 1/44 |
| | | | 213/40 R |
| 2010/0260632 A1 | 10/2010 | Ophardt et al. | |
| 2012/0267399 A1 | 10/2012 | Moretti | |
| 2013/0230423 A1 | 9/2013 | Liesera | |
| 2013/0341366 A1 | 12/2013 | Campbell | |
| 2015/0069094 A1 | 3/2015 | Maher et al. | |
| 2015/0136810 A1 | 5/2015 | Ding | |
| 2016/0201755 A1 | 7/2016 | Hufenbach | |
| 2016/0332181 A1 | 11/2016 | Deman | |
| 2017/0021376 A1 | 1/2017 | Espinoza | |
| 2017/0128966 A1 | 5/2017 | Law et al. | |
| 2017/0190562 A1 | 7/2017 | Trettin | |
| 2017/0247239 A1 | 8/2017 | Nini | |
| 2017/0370756 A1 | 12/2017 | A. Moreno Aparicio et al. | |
| 2018/0186522 A1 | 7/2018 | Kieras et al. | |
| 2018/0188092 A1 | 7/2018 | Kieras et al. | |
| 2019/0054486 A1 | 2/2019 | Deman | |

FOREIGN PATENT DOCUMENTS

| | | |
|---|---|---|
| CN | 111801510 A | 10/2020 |
| DE | 873333 C | 4/1953 |
| DE | 2310209 A1 | 9/1973 |
| DE | 202007002054 U1 | 8/2007 |
| DE | 102010008194 A1 | 8/2011 |
| JP | 2011240992 A | 12/2011 |
| WO | 2007024387 A2 | 3/2007 |
| WO | 2015105715 A1 | 7/2015 |
| WO | 2017050394 A1 | 3/2017 |
| WO | 2019136002 | 7/2019 |
| WO | 2019136003 | 7/2019 |
| WO | 2019136004 | 7/2019 |

* cited by examiner

COMPRESSION SPRING ASSEMBLY AND METHODS OF USING THE SAME

CROSS-REFERENCE TO RELATED APPLICATIONS

This application is a continuation of U.S. application Ser. No. 16/589,991, filed Oct. 1, 2019, which is a continuation of U.S. application Ser. No. 15/861,056, filed Jan. 3, 2018, now U.S. patent Ser. No. 10/473,176, issued Nov. 12, 2019.

BACKGROUND OF THE INVENTION

(1) Field of the Invention

The instant invention generally relates to compression spring systems and more particularly to a compression spring assembly including a polymer spring element for use in a dispensing pump.

(2) Description of Related Art

Dispensing pumps for various liquids, lotions, gels, etc. are known in the art. They generally comprise a body portion which is seated on the neck of a container, a co-acting nozzle portion which slides relative to the body portion, and a spring structure which biases the co-acting nozzle portion to its normal rest position. To dispense the material in the container, the user manually depresses the nozzle which forces the material from the inside of the body portion outwardly through the nozzle. When the nozzle is released, the spring forces the nozzle portion back to its normal resting position. Most of the pump system components are typically formed from polymer materials, with the exception of the spring, which is typically formed from metal. The plastic components are easily recyclable. However, the presence of the metal spring in the pump assemblies has been found to impede or slow the recycling process due to the need to separate the metal spring from the other plastic components. Accordingly, there is a need in the industry for all plastic spring systems for use in various devices such as dispensing pumps.

SUMMARY OF THE INVENTION

An exemplary embodiment of a compression spring assembly according to the present invention includes a slotted tubular spring element formed from a tensile polymer material, and first and second loading cones received at opposing first and second ends of the slotted tubular spring element. In some embodiments, both the spring element and the loading cones may be formed from polymer materials, making the spring assembly more easily recyclable.

In the exemplary embodiment, the slotted tubular spring element is cylindrical in shape and has a uniform wall thickness. The loading cones are generally conical in shape and preferably have at least one wall section with a wall angle of no less than 11 degrees. Wall angles of less than 11 degrees tend to create a friction lock while wall angles of greater than 11 degrees minimize stroke length and increase overall spring assembly diameter. The exemplary embodiment includes loading cones with a first frustoconical pre-loading wall section having a wall angle of greater than 11 degrees, and a second frustoconical primary loading wall section having a wall angle of 11 degrees.

The loading cones are axially compressible toward each other within the open ends of the slotted tubular spring element whereby the slotted tubular spring element radially expands in tension to create an opposing radial contraction force. Deformation of the tubular spring walls elastically stores energy which will return the spring to its normal at rest shape when released. When released, the spring element elastically contracts, in turn creating an axial extension force, and returns the cones to their normal at rest positions.

Some embodiments of the spring assembly include a modified spring element having strain reducing ribs extending along the opposing edges of the longitudinal slot. The ribs may include outwardly convex surfaces extending both radially outward and circumferentially outward from the slot edges. This embodiment further includes a first thinner wall thickness at the slot edges and a second thicker wall thickness diametrically opposed from the slot edges. The arcuate surface along with the increasing wall thickness moving away from the slot edges, more evenly distributes strain throughout the spring element and extends the life cycle of the spring element.

Other embodiments of the spring assembly include a spring element which is hyperboloid in shape.

Embodiments of the present polymer compression spring may be advantageously used in dispensing pumps for various liquids, lotions, etc. In some exemplary embodiments, all of the components of both the dispenser pump and the compression spring assembly are molded from the same plastic material making the entire dispensing pump easily recyclable in a single plastic material classification. Exemplary plastic materials include polypropylene (PP), high-density polyethylene (HDPE), and low-density polyethylene (LDPE). However, the disclosure should not be considered to be limited to these materials.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Referring now to the drawings, an exemplary embodiment of the present compression spring assembly is generally indicated at 10 in FIG. 1-12. According to the present invention, the compression spring assembly 10 comprises a slotted tubular spring element 12 formed from a tensile polymer material, and first and second loading cones 14, 16 received at opposing first and second ends of the slotted tubular spring element 12. In some embodiments, the loading cones 14, 16 could be formed from non-plastic materials, depending on the implementation. However, in the preferred embodiments as disclosed herein, both the spring element 12 and the loading cones 14, 16 are formed from polymer materials. Exemplary plastic materials include polypropylene (PP), high-density polyethylene (HDPE), and low-density polyethylene (LDPE). However, the disclosure should not be considered to be limited to these materials. In particular, the various components may be molded from HDPE and/or LDPE, making the entire spring assembly more easily recyclable.

Figure 1:
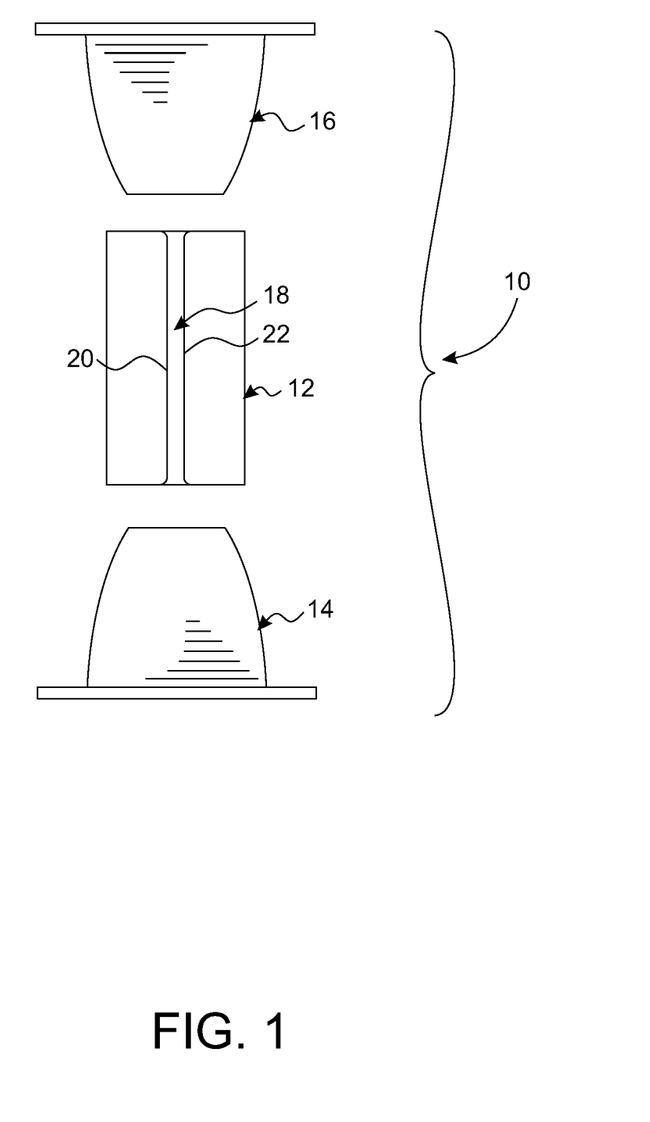
FIG. 1 is a plan view of an exemplary compression spring assembly in accordance with the present invention.
Figure 2:
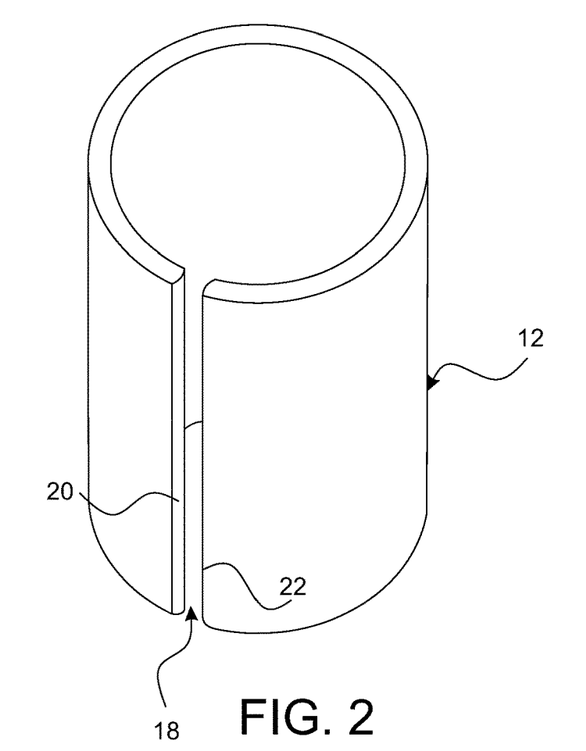
FIG. 2 is a perspective view of the slotted tubular spring element in an at rest condition.
Figure 3:
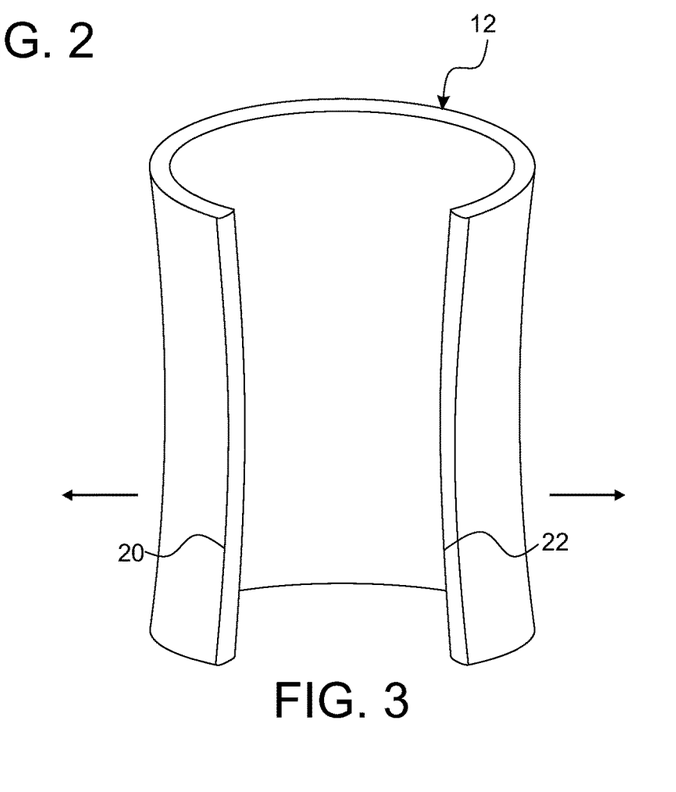
FIG. 3 is a perspective view of the slotted tubular spring element in a radially expanded condition.
Figure 4:
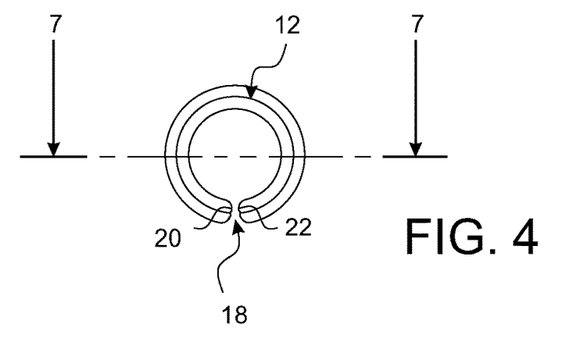
FIG. 4 is a top view of the spring element.
Figure 5:
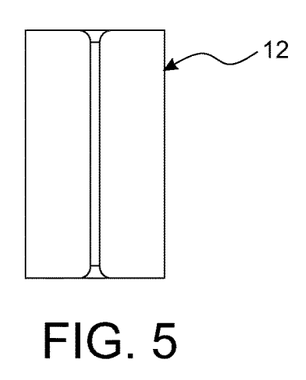
FIG. 5 is a front view thereof.
Figure 6:
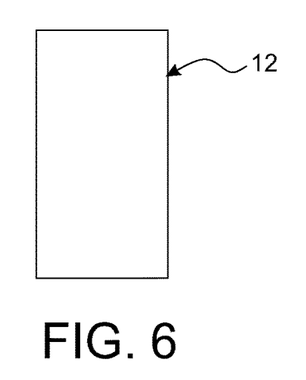
FIG. 6 is a side view thereof.
Figure 7:
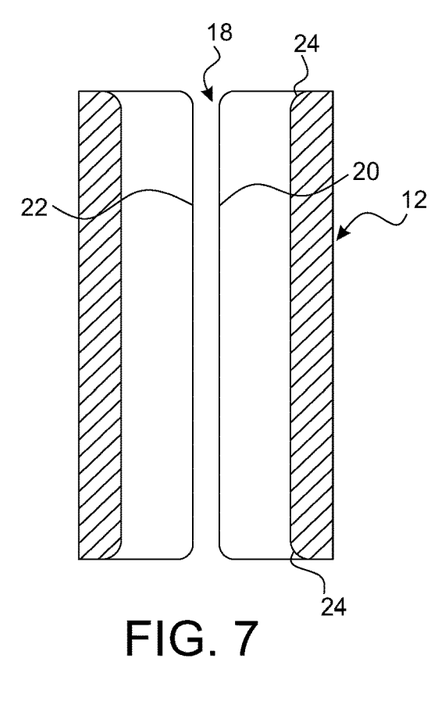
FIG. 7 is a cross-section view thereof taken along line 7-7 of FIG. 4.

In the exemplary embodiment, the slotted tubular spring element 12 is cylindrical in shape and has a uniform wall thickness (best illustrated in FIGS. 2 and 4). The spring element 12 includes a single longitudinal slot 18 which extends the entire length of the tube to define parallel opposing slot edges 20, 22. The slot 18 allows the element 12 to expand radially upon the application of an axial force at the first and second ends thereof. The inner wall edges are chamfered 24 to facilitate sliding of the walls over the loading cone surfaces 14, 16 (best illustrated in FIG. 7).

Figure 8:
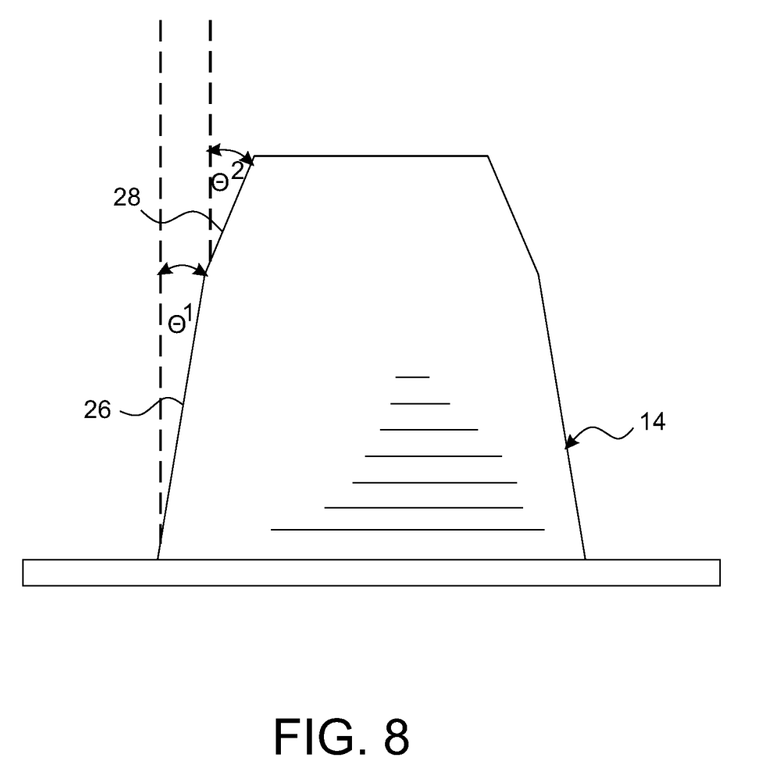
FIG. 8 is an enlarged plan view of the loading cone.

The loading cones 14, 16 are identical in shape and are symmetrically inverted to provide opposing axial compression and extension forces on the tubular spring element 12. Referring to FIG. 8, the loading cones 14, 16 (only 14 is shown) are generally conical in shape and preferably have at least one wall section (primary loading wall) 26 with a wall angle $\theta^1$ of no less than 11 degrees. In the present embodiment, a wall angle of less than 11 degrees tends to create a friction lock while a wall angle of greater than 11 degrees minimizes stroke length and increases overall spring assembly diameter. It should be understood that the critical wall angle for the primary loading wall 26 is based on the type of material used, i.e. polymer or metal, and other factors such as surface finish, shape of wall chamfers, etc. The angle must be selected such that the spring force from the spring element 12 overcomes friction as well as displacement of the applied axial load. The exemplary embodiment, which has an intended use in dispensing pumps for viscous liquids, includes loading cones 14, 16 with a first frustoconical pre-loading wall section 28 having a wall angle $\theta^2$ of greater than 11 degrees, and a second frustoconical primary loading wall section 26 having a wall angle $\theta^1$ of 11 degrees. The steeper pre-load angle $\theta^2$ facilitates the initial expansion of the spring element 12.

Figure 9:
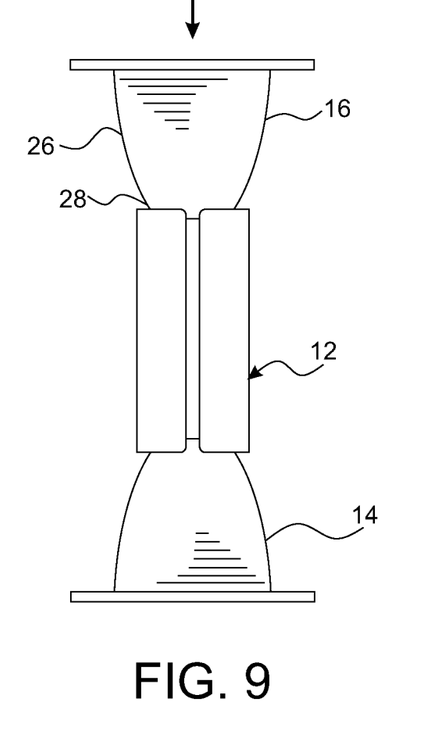
FIGS. 9-12 are sequential views of the compression spring assembly being axially loaded and released.
Figure 10:
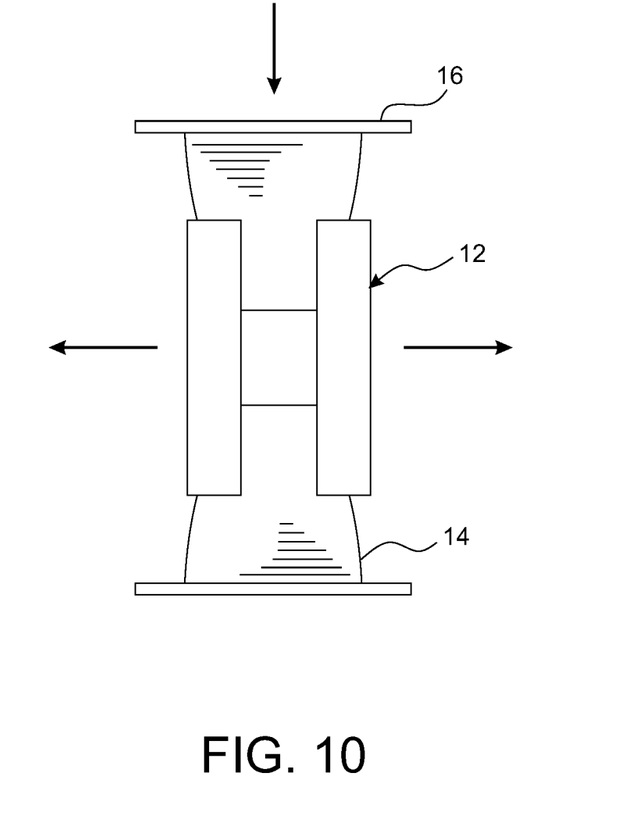
Figure 11:
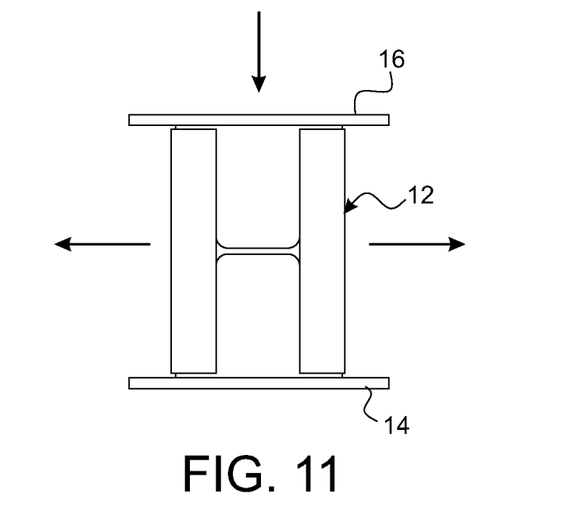
Figure 12:
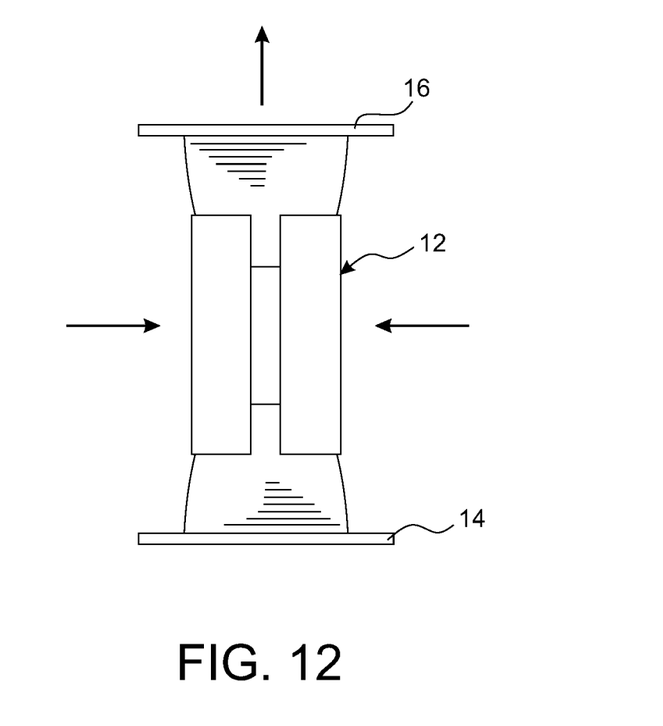

Turning to FIGS. 9-12, the loading cones 14, 16 are axially compressible toward each other within the open ends of the slotted tubular spring element 12 whereby the slotted tubular spring element 12 radially expands in tension to create an opposing radial contraction force. FIG. 9 illustrates an initial at rest state. FIG. 10 illustrates initial pre-load and outward expansion of the spring element. FIG. 11 illustrates full axial compression and load. Deformation of the tubular spring element 12 elastically stores energy which will return the spring element 12 to its normal at rest shape when released. When released as illustrated in FIG. 12, the spring element 12 elastically contracts (inward), in turn creating an axial extension force, and returns the cones 14, 16 to their normal at rest positions.

Figure 13:
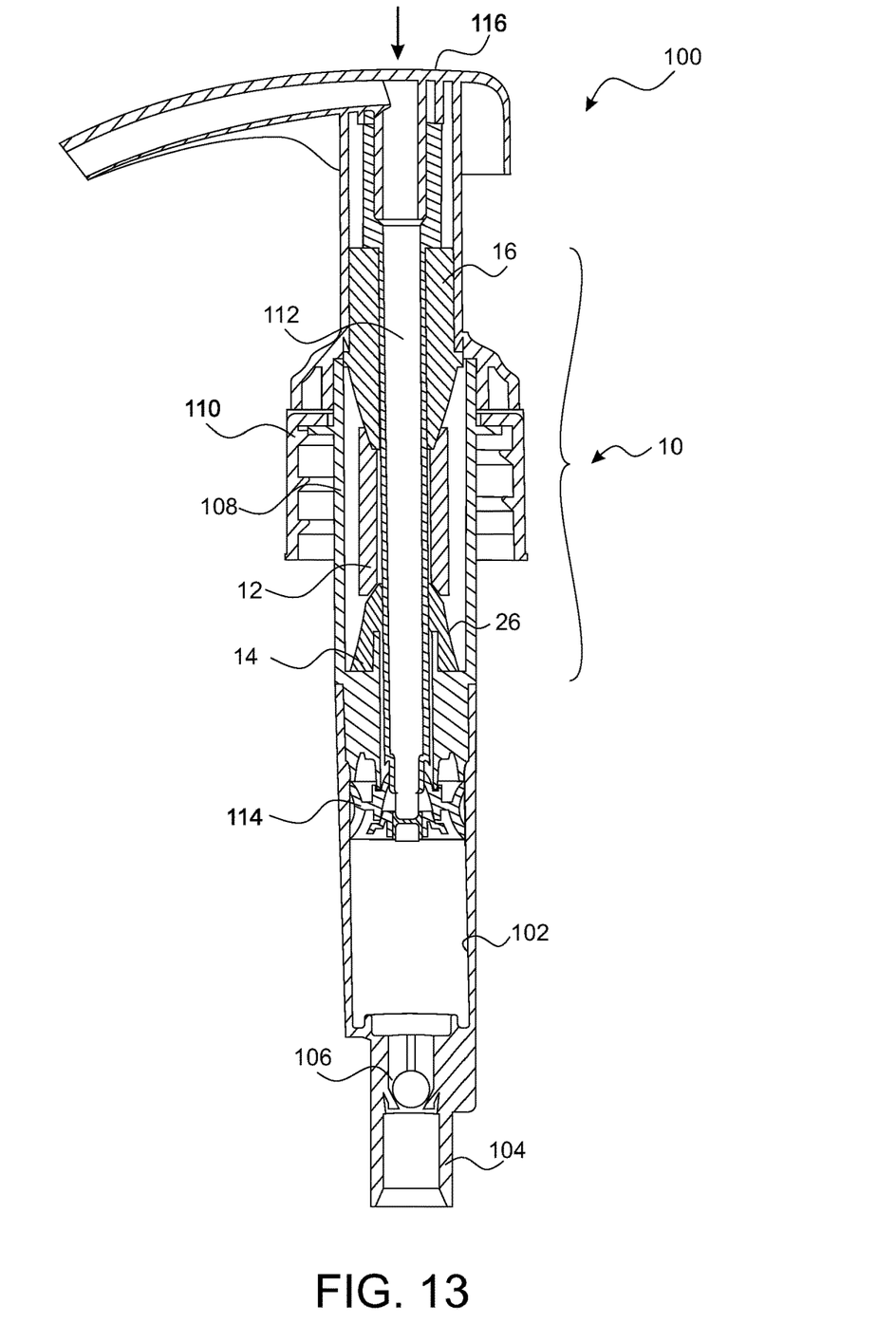
FIG. 13 is a cross-sectional view of an exemplary dispensing pump incorporating the present compression spring assembly.
Figure 14:
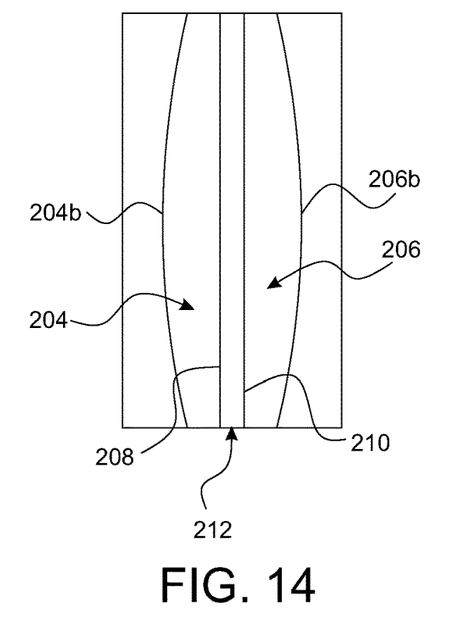
FIG. 14 is a front view of another exemplary embodiment of the slotted tubular spring element including strain reducing ribs.
Figure 15:
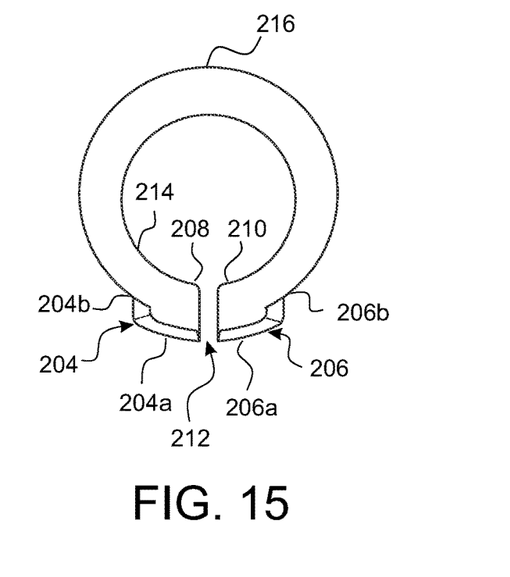
FIG. 15 is a top view thereof.
Figure 16:
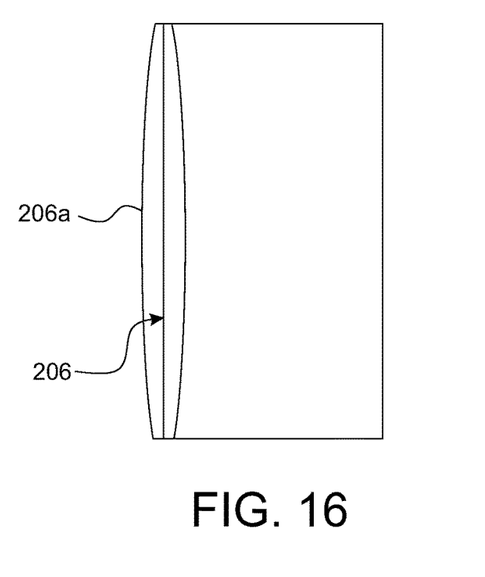
FIG. 16 is a side view thereof.

Turning to FIG. 13, embodiments of the present polymer compression spring 10 may be advantageously used in dispensing pumps 100 for various liquids, lotions, etc. contained within a bottle or other container (not illustrated). In some exemplary embodiments, all of the components of both the dispenser pump 100 and the compression spring assembly 10 are molded from the same plastic material making the entire dispensing pump 100 including the spring assembly 10 easily recyclable in a single plastic material classification.

The dispensing pump 100 comprises an accumulator cup 102 having a dip tube receptacle 104 and ball valve 106 at a lower end thereof. A tubular guide 108 is received in the upper end of the accumulator cup 102, and the tubular guide 108 is secured on a container neck (not shown) with a threaded cap ring 110. The present compression spring assembly 10 is received and guided within the tubular guide 108. As noted above, the angle $\theta^1$ of the loading wall 26 of the loading cones 14, 16 is a critical factor in determining overall spring assembly diameter. As seen in this pump embodiment 100, the spring assembly 10 fits within the inner walls of the guide 108 which in turn must fit within the neck of the container. Accordingly, the wall angle, spring element material and profile are all factors in determining this specification. A piston rod 112 is received axially through the loading cones 14, 16 and the tubular spring element 12 and extends through the bottom of the guide 108 into the accumulator cup 102 wherein the terminal end is fitted with a piston 112 which forms a seal with the inner wall of the accumulator 102. A nozzle head 116 is secured to the upper end of the piston rod 112 and received over the upper loading cone 16.

In operation, a forcible downward compression of the nozzle head 116 causes a corresponding downward axial movement of the upper loading cone 16 relative to the lower loading cone 14 and outward deflection and loading of the spring element 12 as per the illustrations earlier described in FIGS. 9-12. Upon the subsequent release of the nozzle head 116, the tubular spring element 12 elastically contracts back to its normal at rest shape and position (see also FIG. 12), causing a forcible upward movement of the upper loading cone 16, piston rod 112, piston 114 and nozzle head 116 back to their normal at rest positions. The pump assembly 100 and ball valve 106 operate as known in the art to draw material up from the dip tube 104 and dispense the material through the nozzle head 116.

Figure 17:
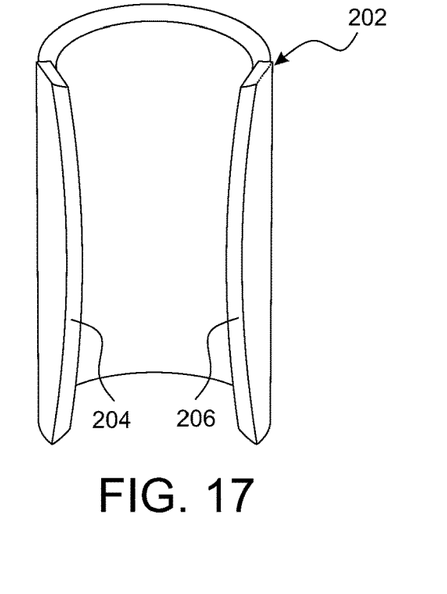
FIG. 17 is a perspective view thereof in a radially expanded condition.
Figure 18:
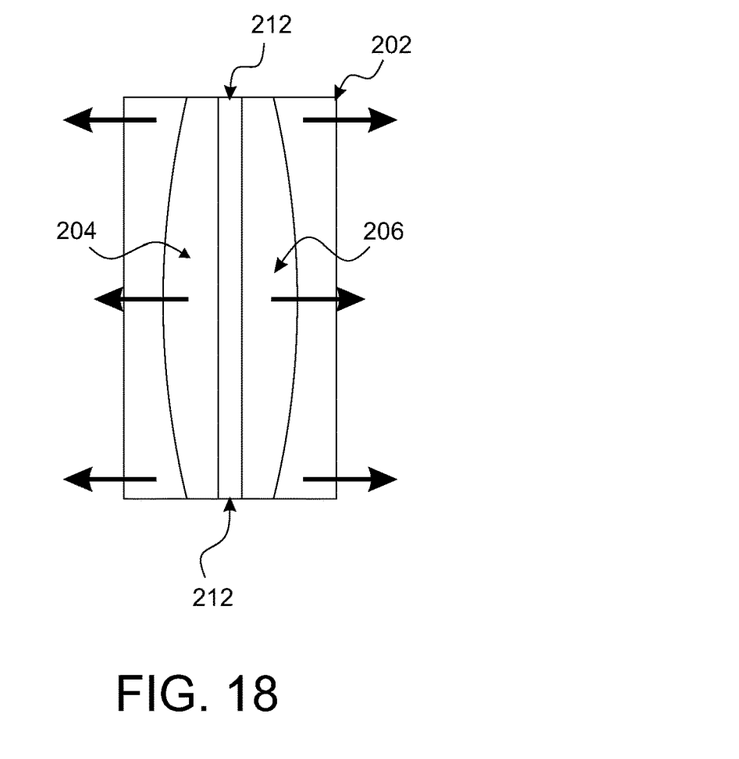
FIGS. 18 and 19 are side and front views thereof showing the bending vectors of the ribs when the spring element is expanded.
Figure 19:
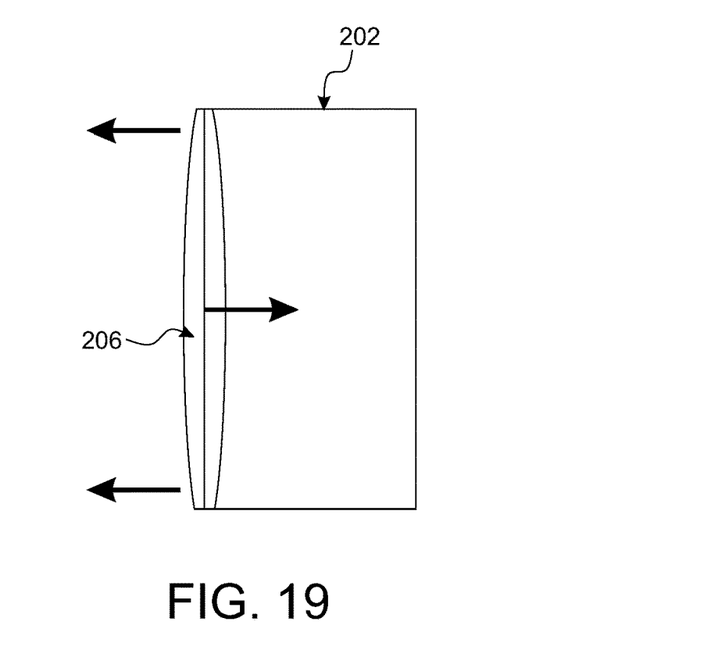
Figure 20:
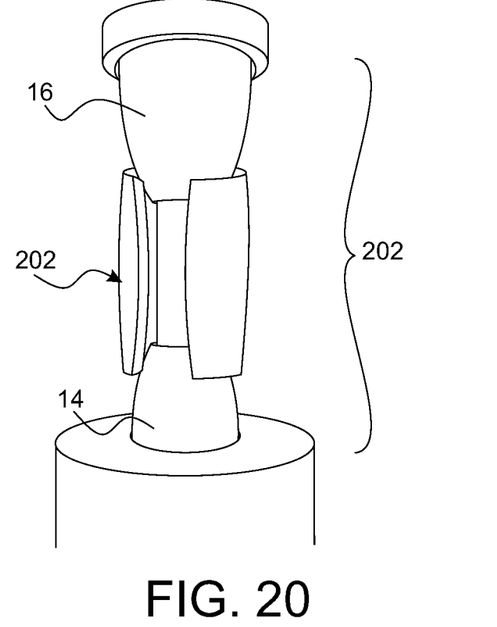
FIG. 20 is an illustration showing initial axial compression of the spring assembly.
Figure 21:
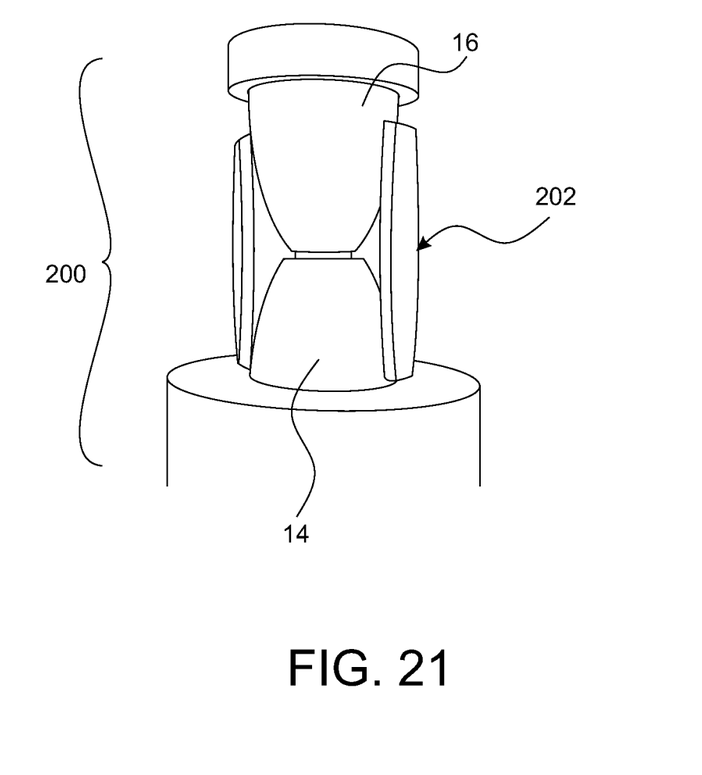
FIG. 21 is another illustration showing full axial compression of the spring assembly.

Turning now to FIGS. 14-21, some embodiments of the spring assembly 200 may include a modified slotted tubular spring element 202 having strain reducing ribs 204, 206 extending along the opposing edges 208, 210 of the longitudinal slot 212. The ribs 204,206 may include symmetrical convex surfaces extending both radially outward 204a, 206a (See FIGS. 15 and 16) and circumferentially outward 204b, 206b (See FIG. 14) from the slot edges 208, 210. This embodiment 202 further includes a first thinner wall thickness 214 at the slot edges 208, 210 adjacent the strain ribs 204, 206 and a second thicker wall thickness 216 diametrically opposed from the slot edges 208, 201 (See FIG. 15). The arcuate surfaces 204a, 204b, 206a, 206b along with the increasing wall thickness moving away from the slot edges 208, 210 more evenly distributes strain throughout the entire spring element 202 and extends the life cycle of the spring element 202. FIG. 17 illustrates the spring element 202 in an expanded loaded state. FIGS. 18 and 19 illustrate the movement vectors (arrows) associated with the corners of the slot edges 208, 210. The reduced material volume in these areas allow these corners to more easily deform and reduce strain. The present spring element 202 is used in combination with the same loading cones 14, 16 as previously described. FIGS. 20 and 21 show axial compression of the present embodiment 200 with exemplary loading cones 14, 16. The present spring assembly 200 can be used in the same types of dispensing pumps 100 as described above with improved spring longevity.

Figure 22:
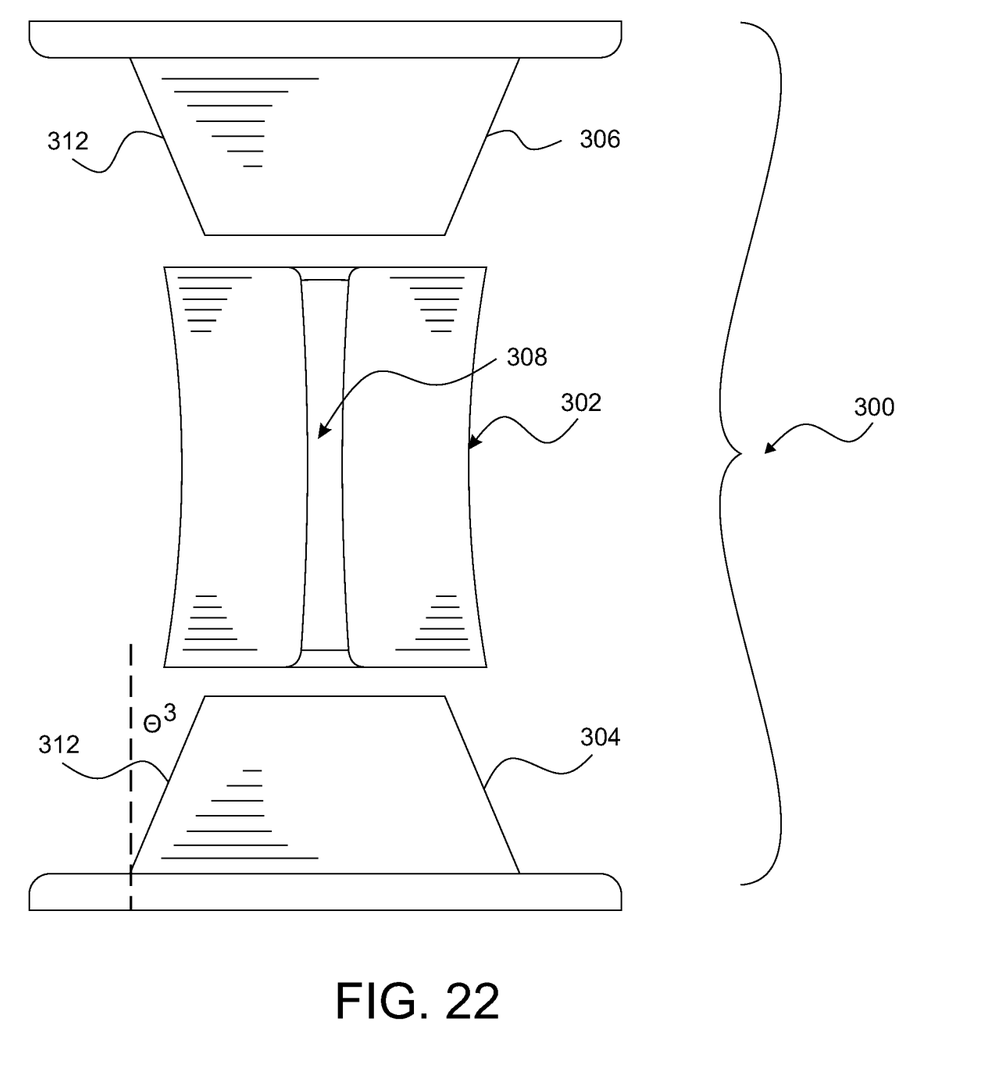
FIG. 22 is a plan view of another exemplary compression spring assembly including a hyperboloid spring element.
Figure 23:
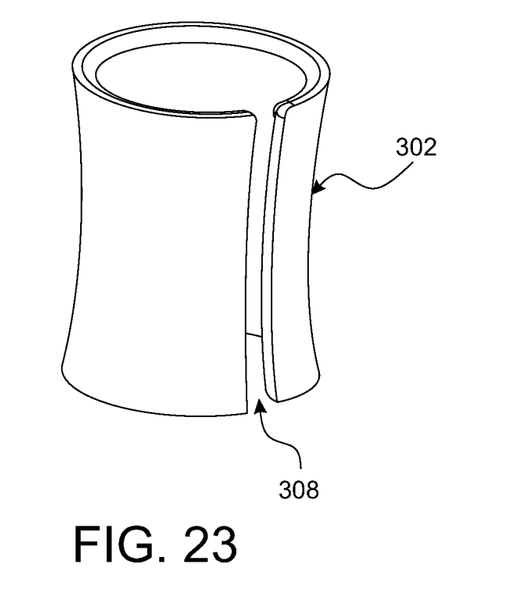
FIG. 23 is a perspective view of the hyperboloid slotted spring element.
Figure 24:
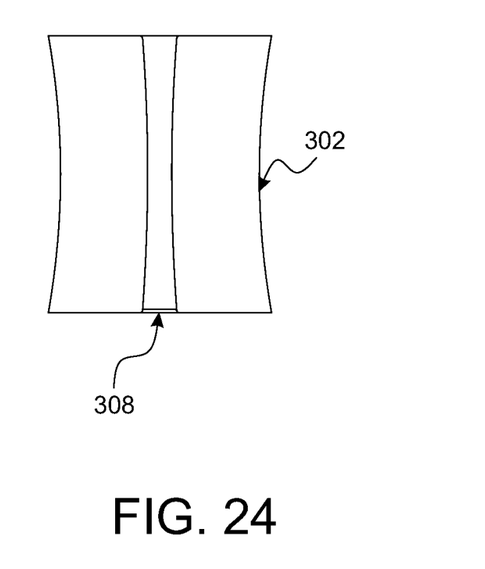
FIG. 24 is a front view thereof.
Figure 25:
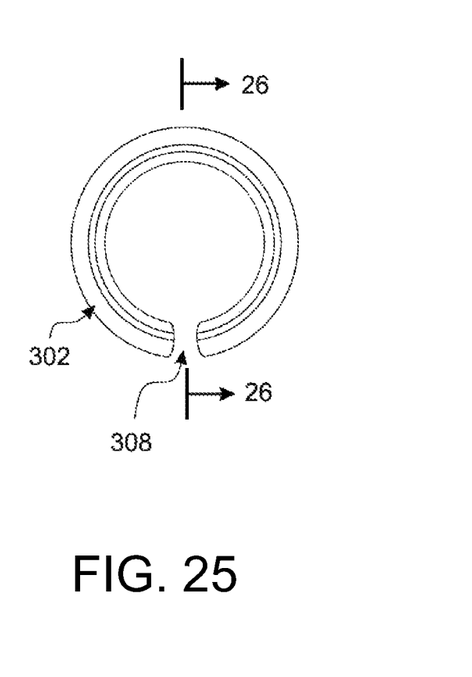
FIG. 25 is a top view thereof.
Figure 26:
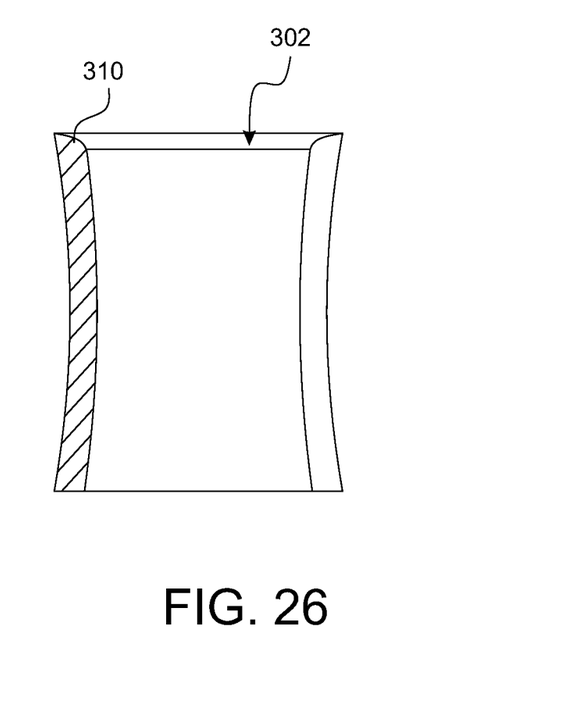
FIG. 26 is a cross-sectional view thereof taken along line 26-26 of FIG. 25.

Referring now to FIGS. 22-27, other embodiments of the compression spring assembly 300 include a slotted tubular spring element 302 which is hyperboloid in shape, i.e. having a smaller (narrower) diameter at the center and symmetrically larger diameters at the ends, and first and second opposed loading cones 304, 306. The spring element 302 has a uniform wall thickness (See FIGS. 25 and 26) and includes a single longitudinal slot 308 (FIGS. 23 and 24) which extends the entire length of the tube, allowing the spring element 302 to expand radially upon the application of an axial force at the first and second ends thereof. The curved spring wall of the hyperboloid spring 302 is provides a stiffer loading profile (higher loading profile) using the same amount of plastic material as compared with the earlier described cylindrical shape (FIGS. 1-12). The inner wall edges are also chamfered 310 to facilitate sliding of the spring element 302 over the loading cone wall surfaces 304, 306 (See FIG. 26). The hyperboloid shape of the spring element 302 works more efficiently with loading cones 304, 306 having a single frustoconical loading wall 312 with a somewhat steeper wall angle $\theta^3$ (FIG. 22). The preferred embodiment as illustrated shows a wall angle $\theta^3$ of greater than 11 degrees. As noted above, the particular wall angle $\theta$ is selected based on the tensile characteristics of the spring element 302 as well as material and surface finishes. The exemplary embodiments are intended to be illustrative but not limiting.

Figure 27:
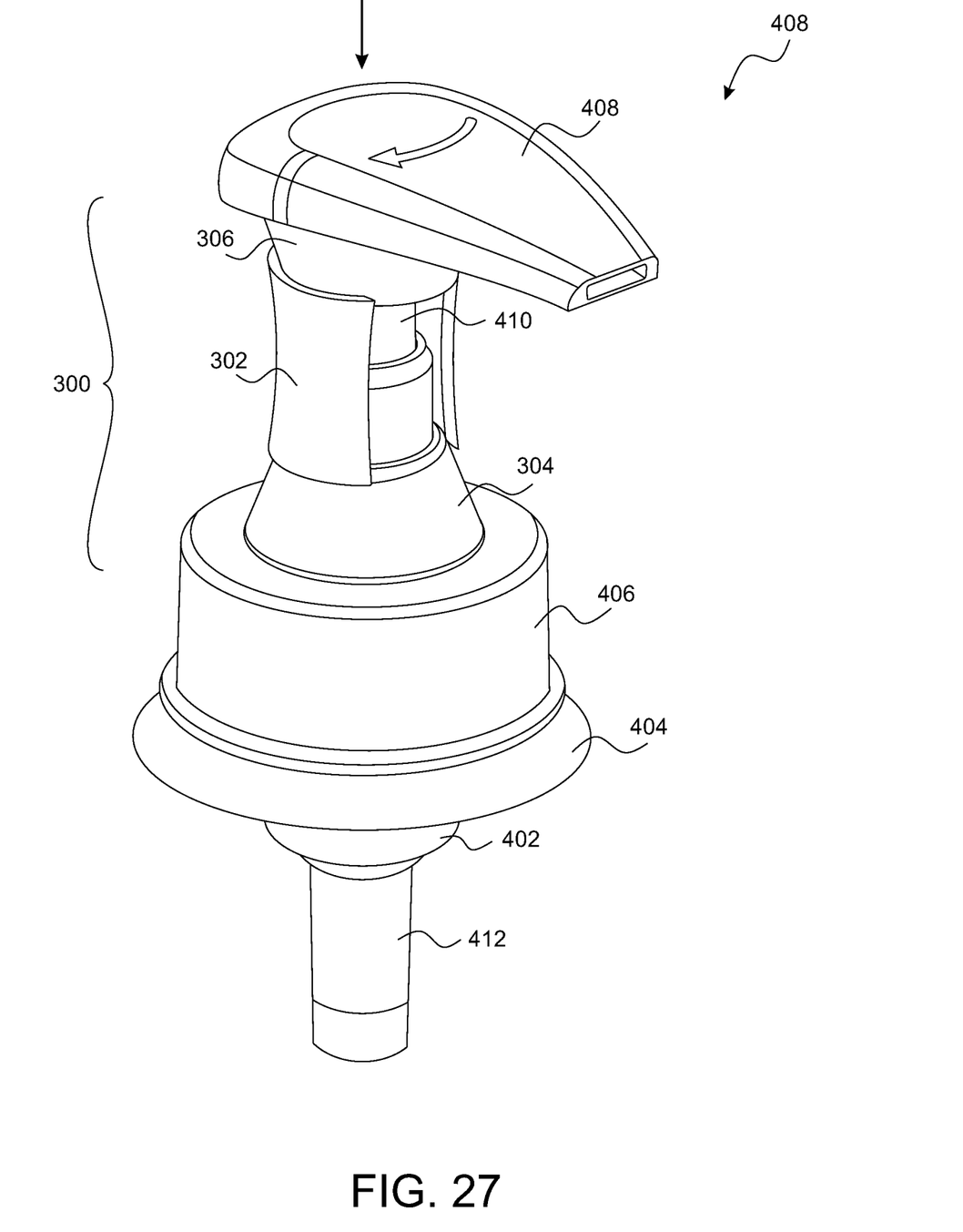
FIG. 27 is a perspective view of another exemplary dispensing pump incorporating the hyperboloid compression spring assembly.

Turning to FIG. 27, the present hyperboloid compression spring assembly 300 lends itself to be advantageously used as an exterior spring return in certain dispensing pumps 400 for various liquids, lotions, etc. As described above, in many exemplary embodiments, all of the components of both the dispenser pump 400 and the compression spring assembly 300 are molded from the same plastic material making the entire dispensing assembly easily recyclable in a single plastic material classification.

Referring to FIG. 27, the dispensing pump 400 comprises an accumulator cup 402 which is secured within the neck of a container 404 with a threaded closure 406. A nozzle head 408 is received on a piston stem 410 which extends through the closure 406 and into the accumulator 402. The loading cones 304, 306 of the present hyperboloid compression spring assembly 300 are integrated into the opposing exterior surfaces of the closure 406 and the top end of the piston stem 410 and the hyperboloid slotted tubular spring element 302 is snap received over and around the piston stem 410 and upward cone extension 304 of the closure 406 so that it engages the ramped loading cone walls 304, 306 of the piston stem 410 and closure 406.

In operation, a forcible downward compression of the nozzle head 408 causes a corresponding downward axial movement of the upper loading cone (piston stem head) 410/306 relative to the lower loading cone (closure) 406/304 and outward deflection and loading of the spring element 302 similar to the illustrations earlier described in FIGS. 9-12. Upon the subsequent release of the nozzle head 408, the tubular spring element 302 elastically contracts (radially inward) back to its normal at rest shape and position, causing a forcible upward movement of the upper loading cone (piston stem) 410/306 and nozzle head 408 back to their normal at rest positions. The piston pump assembly 400 operates as known in the art to draw material up from a dip tube connection 412 and dispense the material through the nozzle head 408.

It can therefore be seen that the exemplary embodiments provide unique and novel compression spring assemblies in which all the discrete components may be molded from a single plastic material to facilitate single stream plastic recycling. Further, the all plastic compression spring assemblies can be advantageously used in all plastic dispensing pumps which can then also be easily recycled.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A tubular spring element for a compression spring assembly, comprising:
    a cylindrical shape, wherein the tubular spring element is molded from a tensile, recyclable polymer material selected from the group consisting of polypropylene, high-density polyethylene, and low-density polyethylene;
    a wall thickness, wherein the wall thickness comprises a uniform wall thickness;
    a first end;
    a second end;
    a single longitudinal slot extending from the first end to the second end; and
    wherein the slot allows the tubular spring element to expand radially upon application of an axial force to an inner wall edge of at least one end of the tubular spring element.

2. The tubular spring element of claim 1, wherein the single longitudinal slot defines a first opposing edge of the single longitudinal slot and a second opposing edge of the single longitudinal slot.

3. A tubular spring element for a compression spring assembly, comprising:

a cylindrical shape;
a wall thickness;
a first end;
a second end;
a single longitudinal slot extending from the first end to the second end;
a first strain reducing rib extending along the first opposing edge; and
a second strain reducing rib extending along the second opposing edge,
wherein the slot allows the tubular spring element to expand radially upon application of an axial force to an inner wall edge of at least one end of the tubular spring element.

4. The tubular spring element of claim 3, wherein each of the first strain reducing rib and second strain reducing rib comprise symmetrical convex surfaces extending radially outward and circumferentially outward from the first opposing edge and second opposing edge.

5. The tubular spring element of claim 3, wherein the wall thickness further comprises:
a first thinner wall thickness at the first slot edge and at the second slot edge adjacent the first strain reducing rib and the second strain reducing rib; and
a second thicker wall thickness diametrically opposed from the slot edges.

6. A tubular spring element for a compression spring assembly, comprising:
a cylindrical shape;
a wall thickness;
a first end;
a second end;
a single longitudinal slot extending from the first end to the second end; and
wherein the slot allows the tubular spring element to expand radially upon application of an axial force to at least one end of the tubular spring element, and
wherein the wall thickness further comprises an increasing wall thickness moving away from the first slot edge and the second slot edge.

7. The tubular spring element of claim 6, further comprising chamfered inner wall edges.

8. The tubular spring elements of claim 6, wherein the tubular spring element is molded from a material selected from the group consisting of polypropylene, high-density polyethylene, and low-density polyethylene.

9. The tubular spring element of claim 6, wherein the tubular spring element is recyclable.

10. The tubular spring element of claim 6, wherein application of an axial force on the first end and the second end creates outward deflection and loading of the tubular spring element which is released with removal of said axial force.

11. A tubular spring element for a compression spring assembly, comprising a slotted tube having a hyperboloid inner and outer wall shape, the slotted tube having
a wall thickness;
a first end;
a second end;
a single longitudinal slot extending from the first end to the second end; and
wherein the slot allows the tubular spring element to expand radially upon application of an axial force to an inner wall edge of at least one end of the tubular spring element.

12. The tubular spring element of claim 11, wherein the wall thickness comprises a uniform wall thickness.

13. The tubular spring element of claim 11, wherein the single longitudinal slot defines a first opposing edge of the single longitudinal slot and a second opposing edge of the single longitudinal slot.

14. The tubular spring element of claim 11, wherein the wall thickness further comprises an increasing wall thickness moving away from the first slot edge and the second slot edge.

15. The tubular spring element of claim 11, further comprising chamfered inner wall edges.

16. The tubular spring elements of claim 11, wherein the tubular spring element is molded from a material selected from the group consisting of polypropylene, high-density polyethylene, and low-density polyethylene.

17. The tubular spring element of claim 11, wherein the tubular spring element is recyclable.

18. The tubular spring element of claim 11, wherein application of an axial force on the first end and the second end creates outward deflection and loading of the tubular spring element which is released with removal of said axial force.

* * * * *